March 6, 1956 E. O. LADE 2,737,638
TERMINAL CONNECTOR FOR WIRE CABLE

Filed Nov. 13, 1951

INVENTOR.
EDWARD O. LADE
BY Hudson Boughton,
Williams, David & Hoffmann.
ATTORNEYS United States Patent Office 2,737,638
Patented Mar. 6, 1956

2,737,638

TERMINAL CONNECTOR FOR WIRE CABLE

Edward O. Lade, Cleveland, Ohio, assignor to The Electric Storage Battery Company, a corporation of New Jersey Application November 13, 1951, Serial No. 256,009

2 Claims. (Cl. 339—273)

The present invention relates to a terminal connector and more particularly to a terminal connector having means to effect good electrical and mechanical connection of a cable wire thereto. The invention has particular utility in connecting an insulated wire cable to a lead terminal connector used to connect storage batteries in a charging circuit.

The principal object of the invention is the provision of a new and improved terminal connector having an aperture therein for the reception of one end of a wire cable and an opening therein intersecting the cable receiving aperture, and a pin insertable into the aperture intersecting the cable receiving opening and having a close fit therein to force the cable wire into clamping engagement with the walls of the opening. Preferably, the pin receiving opening is open at both ends so that the pin is accessible for removal therefrom to disconnect the cable wire from the connector.

The invention resides in certain constructions and combinations and arrangements of parts and further objects and advantages will be apparent to those skilled in the art to which it relates from the following description of the preferred embodiment described with reference to the accompanying drawings forming a part of this specification, in which Fig. 1 is a plan view of a terminal connector having an insulated cable wire attached thereto and which connector is designed for use in connection with storage batteries in a charging circuit;

Figure 1:
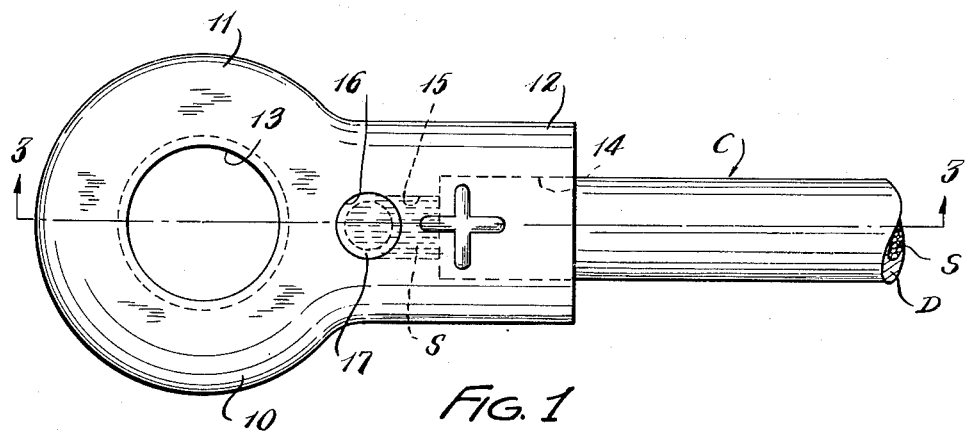
Figure 2:
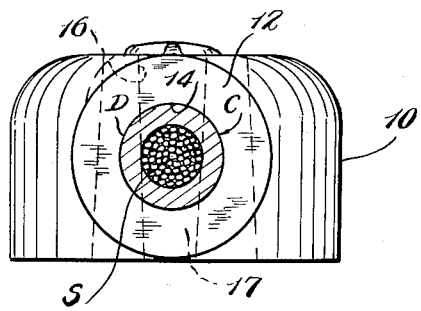
Fig. 2 is an end view of the terminal connector and cable shown in Fig. 1.
Figure 3:
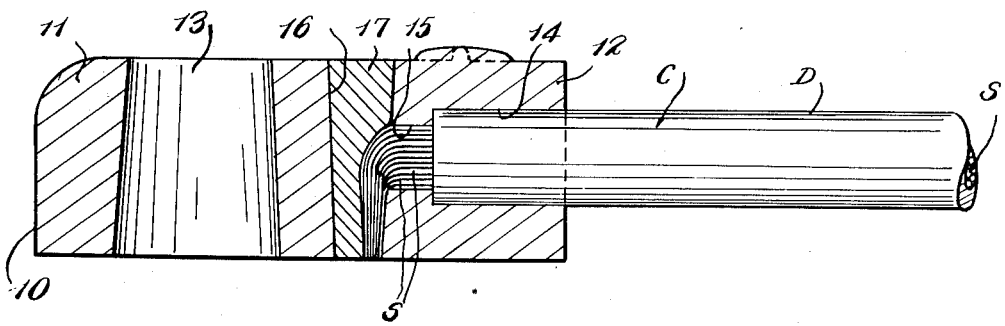
Fig. 3 is a sectional view taken substantially along line 3—3 of Fig. 1.

In charging storage batteries it is customary to provide a lead terminal connector having a tapered opening therein to tightly receive a terminal post of a battery to be charged. The terminal connector is connected in a suitable charging circuit by a wire cable attached thereto, and the present invention is directed to an improved terminal connector of the character referred to by which the wire cable can be securely attached thereto with a good electrical connection.

Referring to the drawing the improved terminal connector shown at 10, is preferably formed of cast lead and comprises an annular portion 11 and a stem 12 projecting radially therefrom. The opening 13 of the annular portion 11 is tapered to tightly receive a storage battery terminal post by which a good electric connection may be made between the terminal connector and post.

The stem 12 has a cylindrical aperture or bore 14 therein which has a reduced portion 15 near the inner end thereof. The aperture 14 can be formed by boring or by a core in the mold in which the connector is cast, and is adapted to receive an end portion of an insulated stranded wire cable C comprising a number of strands of wire S encased within a suitable dielectric material such as rubber D. The reduced portion 15 of the aperture 14 is incapable of receiving the insulated portion of the wire cable, and when the cable is attached to the terminal connector, the end portion of the insulation is removed to expose a length of the wire strands S which project into the portion 15 of the aperture.

The portion 15 of the aperture 14 is intersected by a tapered opening or bore 16 which extends through the terminal connector and the axis of which intersects the axis of the aperture 14. When a wire cable is inserted into the portion 15 of the aperture 14, the wire strands S project transversely of the bore 16, as seen in dotted lines in Fig. 1.

A suitable pin 17, which may be formed of relatively hard lead with respect to the cast lead of the annular portion, is driven into the tapered bore 16 and crowds the wire strands S tightly against the walls of the bore 16 and thereby tightly clamps the wire strands in firm mechanical and electrical engagement with the terminal connector. The pin 17 has a close fit in the bore 16 to eliminate the entrance of liquid into bore 16 and is preferably formed of a relatively soft material with respect to the wire so that it will be displaced by the wire strands S without shearing or damaging the strands.

If it is desirable to remove the wire cable for any reason, the pin 17 is driven from the bore 16 by a driving tool inserted into the tapered end of the bore thereby releasing the wire strands and permitting the cable to be removed from the terminal.

It will be apparent that by my invention I have provided a terminal connector by which wire cables can be securely attached thereto in good electrical contact therewith by a relatively inexpensive and a reliable structure. It will be observed that the connection can be made without the use of molten metal such as lead or solder and that the cable can be readily disconnected from the terminal connector, if desired. While the preferred form of the invention has been described in considerable detail with reference to its use in a charging circuit for a storage battery, it will be apparent that the invention is not limited to this use or to the construction shown, and it is my intention to cover hereby all adaptations, modifications and changes therein which come within the practice of those skilled in the art to which the invention relates and the scope of the appended claims.

Having described my invention, I claim:

1. A terminal connector for electrically and mechanically connecting an insulated conductor cable wire to the terminal of a storage battery for connecting the battery into a charging circuit or the like comprising, a lead member having an annular portion to receive a battery terminal and a stem projecting therefrom normal to the axis of said annular portion and having an axially extending aperture therein for the reception of said wire, said stem having an opening therethrough intersecting the inner end portion of said aperture at substantially right angles thereto, and a pin of softer material than said wire adapted to frictionally engage in said opening and intersect said aperture to clamp the wire of the cable against a wall of said opening, said pin closely fitting within said opening.

2. A terminal connector for electrically and mechanically connecting an insulated conductor cable wire to the terminal of a storage battery for connecting the battery into a charging circuit or the like comprising a member having an annular portion to receive a battery terminal and a stem projecting therefrom having an axial cylindrical aperture therein extending normal to the axis of said annular portion for the reception of said wire, the inner end portion of said aperture having a reduced diameter to receive the uninsulated wire and exclude the insulated portion of the cable, said stem having an opening therethrough intersecting said inner end portion of said aperture at substantially right angles thereto, and a pin of material softer than said wire adapted to frictionally engage in said opening and intersect said aperture to clamp the wire of the cable against a wall of said opening, said pin closely fitting within said opening.

References Cited in the file of this patent

UNITED STATES PATENTS

| | | |
|---|---|---|
| Re. 20,074 | Stahl | Aug. 18, 1936 |
| 1,441,801 | Guenther | Jan. 9, 1923 |
| 1,716,326 | Schlatter | June 4, 1929 |
| 1,808,330 | Waltz | June 2, 1931 |
| 2,278,986 | Gibbs | Apr. 7, 1942 |

FOREIGN PATENTS

| | | |
|---|---|---|
| 283,892 | Switzerland | Nov. 1, 1952 |